Aug. 14, 1923.
C. B. ROWLAND
1,464,541
AGRICULTURAL MACHINE
Filed Jan. 19, 1922
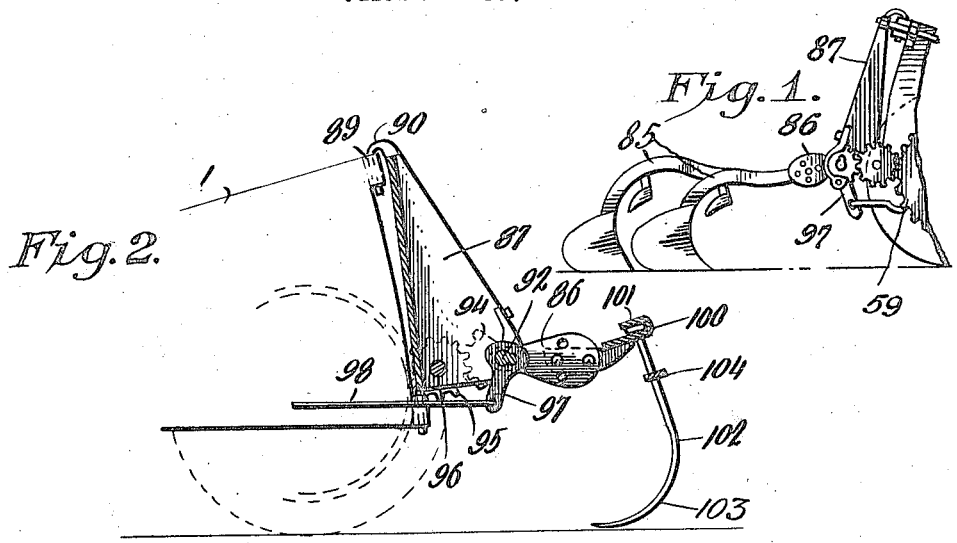
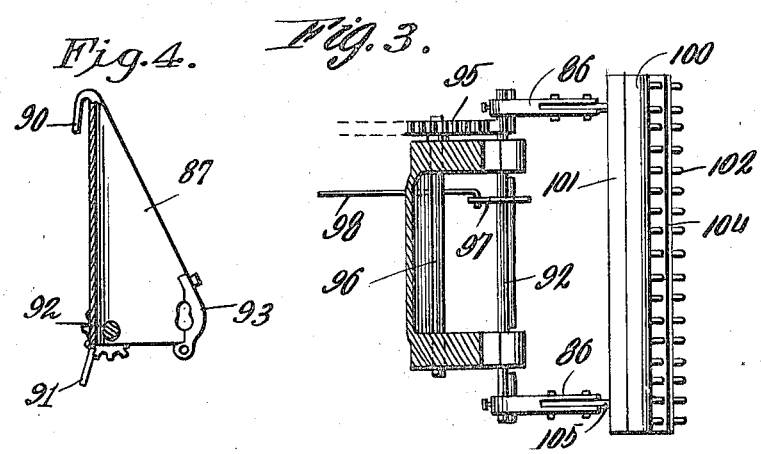
WITNESSES
Inventor
CLIFFORD B. ROWLAND
Attorney Patented Aug. 14, 1923.

1,464,541

UNITED STATES PATENT OFFICE.

CLIFFORD B. ROWLAND, OF TRENTON, NEW JERSEY.

AGRICULTURAL MACHINE.

Application filed January 19, 1922. Serial No. 530,344.

*To all whom it may concern:*

Be it known that I, CLIFFORD B. ROWLAND, a citizen of the United States, residing at Trenton, in the county of Mercer and State of New Jersey, have invented certain new and useful Improvements in an Agricultural Machine, of which the following is a specification.

The present invention relates to agricultural machines and has for its principal object to provide a coupling that is readily attachable upon a tractor for supporting various ground engaging implements.

Another important object of the invention is to provide a coupling possessed of a simple and efficient structure which is reliable in operation, durable, and well adapted to the purpose for which it is designed.

With the above and numerous other objects in view as will appear as the description progresses, the invention resides in certain novel features of construction, and in the combination and arrangement of parts as will be hereinafter more fully described and claimed.

In the drawing—

Figure 1 is a side elevation of the coupler showing the same attached to the rear portion of a tractor, the showing of the tractor being fragmentary, Figure 2 is a vertical section through the coupling and a harrow attached thereto, the rear portion of the tractor being shown in outline, Figure 3 is a horizontal section taken through the structure shown in Figure 2, and Figure 4 is a vertical section through the coupling alone.

Referring to the drawing in detail it will be seen that the rear portion of a tractor has been indicated in Figure 1 to which is attached my coupling 87. Suitable apertured lugs 89 are attached to the tractor which are engageable by the hooks 90 and fingers 91 at the upper and lower ends of the coupling 87 respectively. In side elevation this coupling is shaped triangularly and as shown in Figure 3 is substantially U-shaped in cross section. The lower and rear ends of the coupling 87 are apertured so as to receive a rod 92 and a hinged member 93 in association with the apertures to aid in the insertion and removal of the rod. Various implements may be attached to the coupling 87 by means of this rod 92 and as here shown the arms 86 are attached thereto so as to be keyed therewith and rotate therewith. A gear segment 94 is keyed on the rod 92 and is in mesh with a gear 95 keyed on a shaft 96 rotatable in the coupling and engageable with the gear 59. When the gear 59 is in mesh with the gear 96 it will rotate the same so as to rotate the gear segment 94, rotating the pin 92, rotating the arms 86 so as to lift the implement such as the drag plow 85 shown in Figure 1 attached thereto out of engagement with the ground. A crank 97 is also keyed to the rod 92 and is controlled by the rod 98 operated by a suitable lever 99. This is especially desirable when the implements carried on the rear end of the machine are heavy and as is often the case considerable earth clings thereto. In Figures 2 and 3 a harrow indicated generally at 100 is attached to the arms 86 and includes the curved tine receiving plate 101. The tines 102 extend therefrom and are curved forwardly adjacent their ends as seen at 103. These tines are braced in relation to each other by an apertured rod 104. The plate 101 is provided with arms 105 which fit between the bifurcated ends of the arms 86 shown to advantage in Figure 2.

Although I have described my invention with a certain degree of particularity it is to be noted that numerous changes in the details of construction and in the combination and arrangement of parts may be resorted to without departing from the spirit of the invention.

Having thus described my invention what I claim as new and desire to protect by Letters Patent is:—

1. In an agricultural machine of the class described, a frame, a coupler attachable to the frame, a drive gear associated with the frame, a rotatable rod associated with the coupler, means for rotating the rod through the drive gear, and means for attaching implements to the rod so that they may be raised from and lowered into engagement with the ground in the manner and for the purpose specified.

2. A coupler to be used in the manner and for the purpose specified including a frame, means on the frame for attaching it to a tractor or the like, a rotatable rod mounted in the frame, a rotatable shaft mounted in the frame, a gear on the rod, a gear on the shaft in mesh with the rod gear.

In testimony whereof I affix my signature in presence of two witnesses.

CLIFFORD B. ROWLAND.

Witnesses:
CHRISTINA ANDERSON,
WILLIAM H. COLLINGSWORTH.